United States Patent
Wei et al.

(10) Patent No.: US 11,613,047 B2
(45) Date of Patent: Mar. 28, 2023

(54) MICROWAVE-ENHANCED EXTRUDER FACILITY AND ORGANIC REACTION MODULE

(71) Applicant: GuangDong YCX Precision Manufacturing Co., Ltd., Guangdong (CN)

(72) Inventors: Wenshan Wei, Guangdong (CN); Chen Li, Guangdong (CN)

(73) Assignee: GuangDong YCX Precision Manufacturing Co., Ltd., Guangdong (CN)

( * ) Notice: Subject to any disclaimer, the term of this patent is extended or adjusted under 35 U.S.C. 154(b) by 47 days.

(21) Appl. No.: 17/321,497

(22) Filed: May 16, 2021

(65) Prior Publication Data
US 2022/0032504 A1 Feb. 3, 2022

(30) Foreign Application Priority Data
Jul. 30, 2020 (CN) .......................... 202021554134.5

(51) Int. Cl.
| | |
|---|---|
| *B29B 13/08* | (2006.01) |
| *B29C 48/68* | (2019.01) |
| *B01J 19/12* | (2006.01) |
| *B29C 48/80* | (2019.01) |

(52) U.S. Cl.
CPC ............. *B29B 13/08* (2013.01); *B01J 19/126* (2013.01); *B29C 48/682* (2019.02); *B29C 48/6803* (2019.02); *B29C 48/832* (2019.02)

(58) Field of Classification Search
CPC ..... B29B 13/08; B29C 48/832; B29C 48/682; B29C 48/6803; B29C 47/80; B01J 19/126; H05B 6/72; H05B 6/64; H05B 6/70
See application file for complete search history.

(56) References Cited

U.S. PATENT DOCUMENTS

| | | | | |
|---|---|---|---|---|
| 4,746,220 A | * | 5/1988 | Sukai | ...................... B29B 7/428 |
| | | | | 425/207 |
| 2018/0126597 A1 | * | 5/2018 | Rust | .......................... B29B 7/84 |

FOREIGN PATENT DOCUMENTS

| | | | | | |
|---|---|---|---|---|---|
| CN | 203110305 | * | 8/2013 | ............. | B29C 47/66 |
| CN | 104761666 | * | 7/2015 | ............. | C08F 14/06 |
| EP | 2741575 | * | 2/2012 | ............... | H05B 6/72 |
| FR | 2614490 | * | 4/1987 | ............... | H05B 6/80 |

* cited by examiner

*Primary Examiner* — Galen H Hauth
*Assistant Examiner* — Shibin Liang
(74) *Attorney, Agent, or Firm* — JCIP Global Inc.

(57) ABSTRACT

Disclosed are a microwave-enhanced extruder facility and an organic reaction module. The microwave-enhanced extruder facility includes a screw extruder and a microwave generator. The screw extruder includes a feeding module and an organic reaction module. The feeding module includes a plurality of conveying blocks connected to each other. First barrels are clamped in the first conveying blocks, and screws are arranged in the first barrels. The organic reaction module is connected to the microwave generator and includes a second conveying block, and the microwave generator is connected to the second conveying block. The second conveying block is provided with two clamping plates and a frame connecting the two clamping plates. A second barrel is clamped in the second conveying block. Waveguide tubes are connected to the upper and lower ends of the second conveying blocks respectively.

10 Claims, 7 Drawing Sheets

MICROWAVE-ENHANCED EXTRUDER FACILITY AND ORGANIC REACTION MODULE

CROSS REFERENCE TO RELATED APPLICATION

This application claims the priority benefit of China design patent application serial no. 202021554134.5 filed Jul. 30, 2020. The entirety of the above-mentioned patent application is hereby incorporated by reference herein and made a part of the specification.

BACKGROUND OF THE INVENTION

1. Technical Field

The invention relates to the technical field of chemical equipment, in particular to a microwave-enhanced extruder facility and an organic reaction module which can guide microwaves into a working area of a screw extruder under the condition where a microwave radiation leakage is less than a safety value.

2. Description of Related Art

As is commonly known, chemical reactions are generally produced in a solid state, liquid state, gaseous state or plasma state. During the chemical reaction process, electrons outside nucleuses of reactants are exchanged and shared and electron clouds are redistributed to produce a new substance. As for chemical reactions for organic synthesis and high-polymer material polymerization, the molecular weight of participant reactants and products are very large in most cases, so the reaction time is usually longer than that of inorganic chemical reactions. Especially in the high-polymer material polymerization process, the viscosity will change with the increase of the molecular chain, and to avoid a high-viscosity reaction process and realize a complete and uniform high-polymer material polymerization reaction, a monomer is generally diluted with a solvent to prepare a dilute solution to carry out the polymerization reaction. Although this method can promote the polymerization reaction, a series of operations such as dissolution, evaporation, separation and purification are needed in the chemical process, which leads to higher energy consumption and emission of more waste gas and liquid, and is not beneficial to environmental protection. In view of this, those skilled in the art are searching for a satisfying chemical reactor which is beneficial to environmental protection and adaptable to high-viscosity chemical reactions.

Originating from the $18^{th}$ century, the manual piston extruder for seamless lead tubes made by Joseph Bramah (England) in 1795 was considered as the first extruder in the world. From then on, the extruder was basically used for producing lead tubes, processing macaroni and other foodstuffs, and making bricks and ceramics in the fifty years before the $19^{th}$ century. In the development process of the extruder as a manufacturing method, the first clear record was the patent for producing Portland glue cables by the extruder, applied for by R. Brooman in 1845, the extruder was improved by H. Bewlgy in Portland Corporation, and in 1851, it was used for wrapping the copper wire of the first submarine cable between Dover and Calais. In 1879, M. Gray from Britain gained the first patent of an Achimedean spiral-based screw extruder, and in the next 25 years, the extrusion method gradually drew more attention, and traditional manual extruders were gradually replaced with electrical extruders. The synthetic polymer industry developed in the mid-nineteenth century promoted the application of high-polymer extrusion, different types of polyvinyl chloride have been extruded in 1925, the first single-screw extruder which was successfully manufactured by German manufacturer in 1935 Paul Troestar specifically for thermoplastic plastics marked the beginning of the modern extrusion process, and from the first single-screw extruder to today's different types of single-screw extruders and twin-screw extruders, the extruder has a development history of 70 years. Wherein, the twin-screw extruders include intermeshing twin-screw extruders and non-intermeshing twin-screw extruders according to the relative position of two screws, parallel twin-screw extruders and tapered twin-screw extruders according to the structure and shape of the two screws, and co-rotating twin-screw extruders and counter-rotating twin-screw extruders according to the rotating directions of the two screws. At present, the single-screw extruders are mainly used for extrusion of high-polymer materials. The co-rotating intermeshing parallel twin-screw extruders generate little heat during material friction, can shear materials uniformly, are provided with screws with a high conveying capacity, have a stable extrusion output, and allow the materials to stay in the barrel for a long time to be evenly mixed, and have better mixing, exhausting, reaction and self-cleaning functions than the single-screw extruders, thus not only being used for extrusion, but also being used for high-polymer material modification and common grafting reactions.

In view of the requirements of chemical reactions, the co-rotating intermeshing parallel twin-screw extruders better conform to the conditions of an ideal reactor; however, due to the limitations of the manufacturing process of the extruders and the material performance, the extruders cannot be too long, and to ensure that the speed and yield meet cost requirements, short extruders cannot allow materials stay therein for a long time, which is generally within 15 minutes. But most chemical reactions for high-polymer material polymerization and organic synthesis take a long time, which is commonly several hours or even tens of hours. The prospect of using the extruder as an ideal reactor is never realized due to the limitation of the reaction time. As long as the problem of long reaction time is solved, the twin-screw extruder can be used as a reactor to realize this prospect for users.

Generally, the chemical reaction time is shortened by increasing the temperature, using a catalyst, or using other energy enhancement means such as microwaves, ultrasounds and light. Scientists have found by study that microwaves can significantly shorten the chemical reaction time, and it is reported in Modern Chemical Industry (April, 2001, Vol. 21 No. 4, New Progress of Microwave Heating Applied in Chemical Reaction, Yang, Bolun, Ji, Yongjun) that the common chemical reaction time can be shortened to several days, several hours or even several minutes with the aid of microwaves.

Microwaves are electromagnetic waves with the frequency from 0.3 GHz to 300 GHz and the wavelength from 1 cm to 1 m, and the frequency of the microwaves is between the frequency of infrared rays and the frequency of radio waves. Electromagnetic waves with the wavelength from 1 cm to 25 cm are used for radar emission, and electromagnetic waves with other wavelengths are used for radiocommunication. To protect the radiocommunication against interference, the frequency of microwaves for domestic microwave ovens and for chemical reactions is usually set to 2.45 GHz, and corresponding wavelength is 12.25 cm, and this is also the ISM (Industrial Scientific Medical) frequency used for industry, science and medical science by international agreement. The microwave radiating energy (0.0016 eV) at this frequency is lower than the bond energy (>3 eV) of various covalent bonds in high molecular compounds and is far from being able to break these covalent bonds, so the high molecular compounds will not be decomposed by the microwave radiating energy at this frequency.

In the 1940s, microwave energy was first used to heat food by Percy Spencer, and in the 1980s, it was used for organic synthesis including polymerization reactions, organic reactions for polymer melting and polymer cross-linking, and modification reactions. In 1986, a research group represented by Richard Gedye reported, for the first time, the acceleration of organic chemical conversion by microwave heating.

In case where polar molecules with a dipole moment exist during microwave radiation, the oscillation of an electric field generated by microwaves will leads to the oscillation of the dipole of the polar molecule; when 2.45 GHz microwaves are used to radiate the polar molecules, the oscillation of the dipole of the polar molecules will be rearranged and cannot accurately follow changes of the AC electric field of the microwaves, which results in friction between the molecules and dielectric losses, the energy will be consumed in the form of heat, and the polar molecules are heated. Microwave heating can realize synchronous heating of the interior and the exterior of a polar dielectric, thus having the characteristics of uniform heating and high heating speed. In the other aspect, the high oscillation speed (245,000,000 per second) of the polar molecules greatly increases the probability of collision between the polar molecules, the chemical reaction rate will be increased by hundreds of times, and thus, the chemical reaction time is greatly shortened. Solutions for using microwave radiation for organic synthesis have been mentioned in Chinese patent documents CN104759244A, CN202045846U, CN10544758A, CN201227587Y, CN205800147U and CN104761666A, as well as Japanese patent document JPS56121754A and US patent documents U.S. Pat. Nos. 4,957,042A and 4,949,628A, but all these documents fail to provide detailed structural compositions, which is not beneficial to industrialization development. Particularly, how to guide microwaves into the extruder module, what specific devices are needed and how to transform the extruder are not reflected in these patent documents, and have become issues to be settled by those skilled in the art.

BRIEF SUMMARY OF THE INVENTION

In view of this, the objective of the invention is to provide a microwave-enhanced extruder facility which is provided with a screw extruder for heating to accelerate organic chemical reactions, and an organic reaction module.

The technical solution adopted by the invention to solve the above-mentioned technical problems is as follows: a microwave-enhanced extruder facility comprises a screw extruder and a microwave generator, wherein the screw extruder comprises a feeding module and an organic reaction module, the feeding module is connected to the organic reaction module and comprises a plurality of first conveying blocks connected to each other, first barrels are clamped in the first conveying blocks and are connected to each other, and screws are arranged in the first barrels; the organic reaction module is connected to the microwave generator and comprises a second conveying block, the microwave generator is connected to the second conveying block, the second conveying block is provided with two parallel clamping plates and a frame connecting the two clamping plates, a second barrel is clamped in the second conveying block, the screws are able to extend into the second barrel, the second barrel is clamped in a frame, second insulating plates are arranged on the periphery of the frame, two sides of the clamping plates are connected to side partition plates respectively, the second insulating plates are clamped in spaces defined by the side partition plates and the frame, and quartz blind plates are arranged at an upper end and a lower end of the second conveying block respectively and are correspondingly disposed at outlets of the microwave generator.

In one embodiment, one end of the microwave generator is connected to a power division tube, a power divider is arranged in the power division tube, two ends of the power division tube are connected to connecting tubes respectively, one end of each of the connecting tubes is connected to a waveguide tube, and the waveguide tubes are connected to the upper end and the lower end of the second conveying block, respectively.

In one embodiment, the feeding module is to be connected to a feeding device, and the feeding device is connected to one of the first conveying blocks and feeds materials into one of the first conveying blocks.

In one embodiment, the cross-section of the first conveying blocks is H-shaped, and first insulating plates are arranged on the periphery of each of the first conveying blocks.

In one embodiment, the frame is formed with a plurality of openings, quartz blocks are arranged in the openings, and microwaves generated by the microwave generator enter the second barrel via the quartz blocks.

In one embodiment, the frame comprises four first connecting pillars and a second connecting pillar, wherein the cross-section of the first connecting pillars and the cross-section of the second connecting pillar are both square, the first connecting pillars are arranged at four corners of the clamping plates respectively and are connected through the second connecting pillar, and the openings are defined by the first connecting pillars and the second connecting pillar.

In one embodiment, the first barrels and the second barrel are made of zirconia.

In one embodiment, the organic reaction module comprises two second conveying blocks which are connected to the waveguide tubes respectively, the microwave generator transmits microwaves into the second barrels of the two second conveying blocks through the waveguide tubes, and the two second conveying blocks are connected through the first conveying blocks.

An organic reaction module comprises a second conveying block, wherein the second conveying block is provided with two parallel clamping plates and a frame connecting the two clamping plates, a second barrel is clamped in the second conveying block and is clamped in a frame, second insulating plates are arranged on the periphery of the frame, two sides of the clamping plates are connected to side partition plates respectively, the second insulating plates are clamped in spaces defined by the side partition plates and the frame, and quartz blind plates are arranged at an upper end and a lower end of the conveying block respectively.

In one embodiment, the frame is formed with a plurality of openings, and quartz blocks are arranged in the openings.

To sum up, according to the microwave-enhanced extruder facility and the organic reaction module of the invention, the waveguide tubes are connected to the upper end and the lower end of the second conveying block respectively, and microwaves generated by the microwave generator heat materials in the second barrel from the upper end and the lower end of the second conveying block respectively, so that the organic chemical reaction rate of the materials in the screw extruder is effectively increased.

DETAILED DESCRIPTION OF THE INVENTION

The technical solution of the invention will be clearly and completely described below in conjunction with the accompanying drawings. Obviously, the embodiments described below are merely illustrative ones, and are not all possible ones of the invention. All other embodiments obtained by those ordinarily skilled in the art based on the following ones without creative labor should also fall within the protection scope of the invention.

It should be noted that the terms such as "central", "upper", "lower", "left", "right", "vertical", "horizontal", "inner" and "outer" in the description of the invention are used to indicate directional or positional relations based on the accompanying drawings only for the purpose of facilitating and simplifying the description of the invention, do not indicate or imply that a device or an element referred to must have a specific direction or be configured and operated in a specific direction, and thus should not be construed as limiting the invention. In addition, the terms such as "first", "second" and "third" are merely for the purpose of description, and do not indicate or imply relative importance.

It should be further noted that unless otherwise explicitly stated and defined, the terms "mount", "connect" and "connection" should be understood broadly. For example, "connection" may refer to fixed connection, detachable connection or integral connection, or mechanical connection or electrical connection, or directly connection or indirect connection through an intermediate medium, or internal communication of two elements. Those ordinarily skilled in the art can appreciate the specific meanings of these terms in the invention as the case may be.

Figure 1:
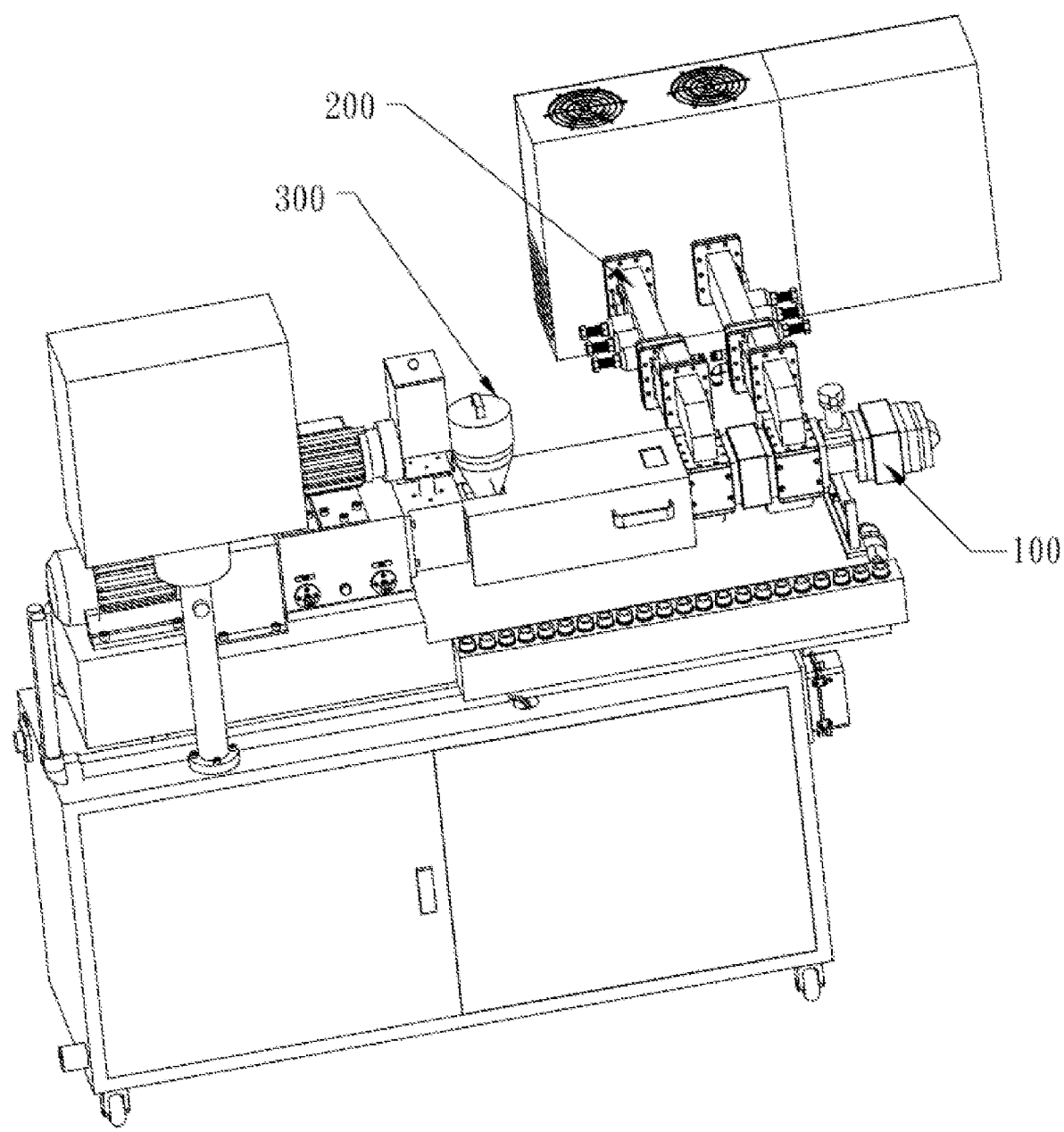
FIG. 1 is a structural diagram of a microwave-enhanced extruder facility according to the invention.
Figure 2:
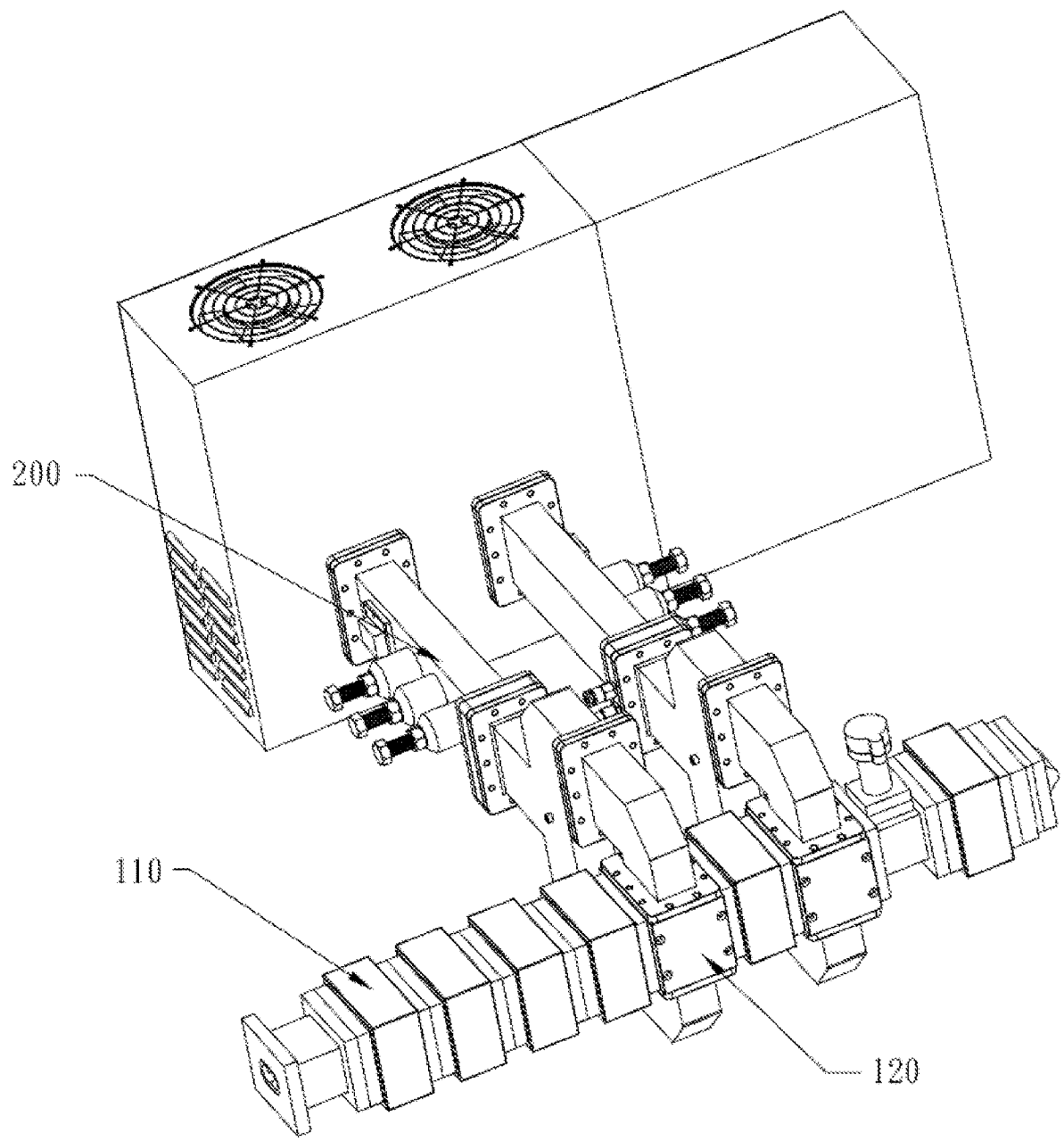
FIG. 2 is a structural diagram of the micro-enhanced extruder facility with a feeding device being hidden according to the invention.
Figure 3:
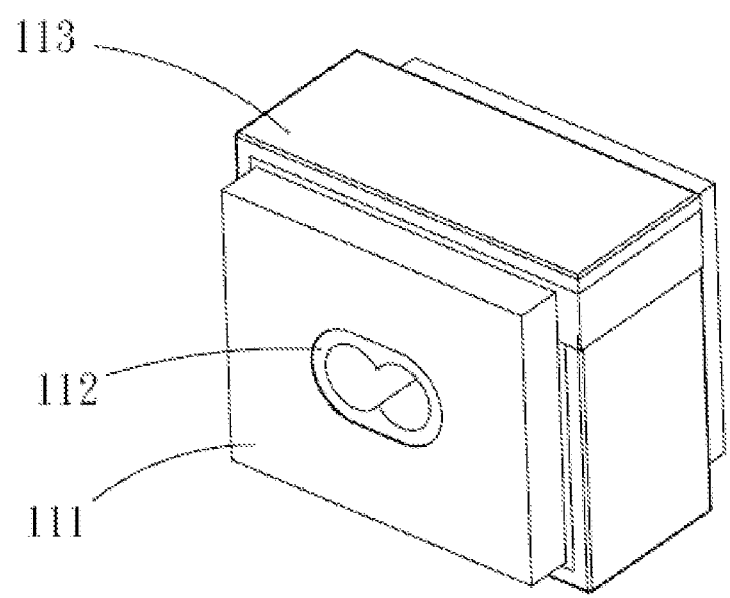
FIG. 3 is a structural diagram of a feeding module according to the invention.
Figure 4:
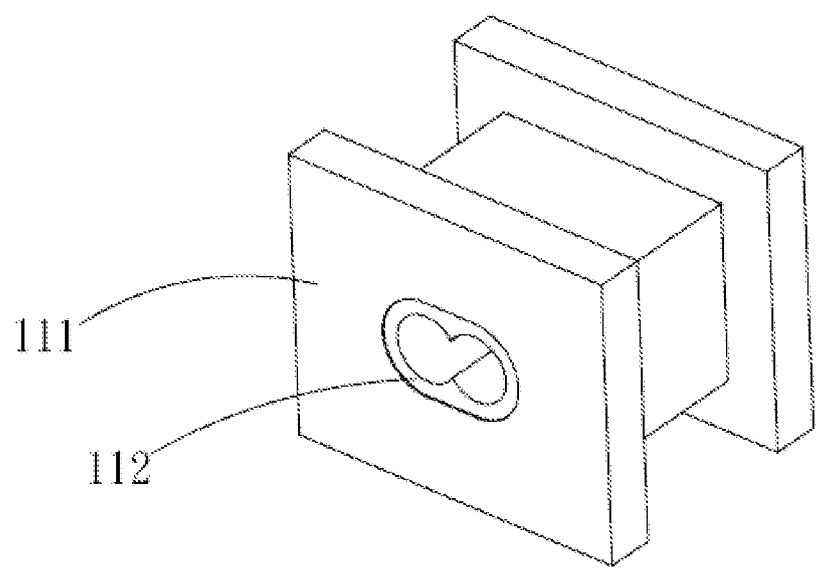
FIG. 4 is a structural diagram of the feeding module with first insulating plates being hidden according to the invention.
Figure 5:
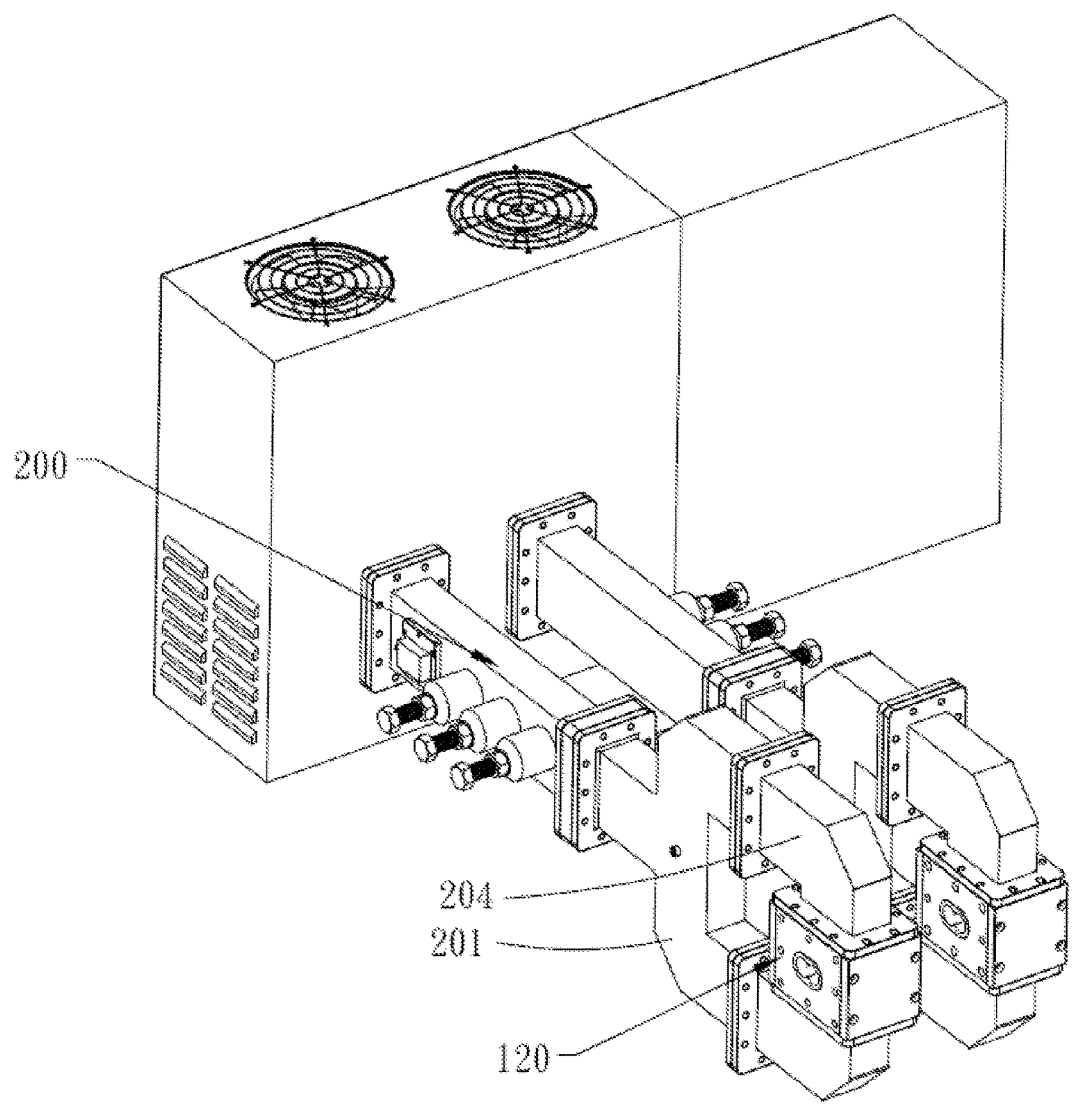
FIG. 5 is an assembled diagram of a microwave generator and an organic reaction module according to the invention.
Figure 6:
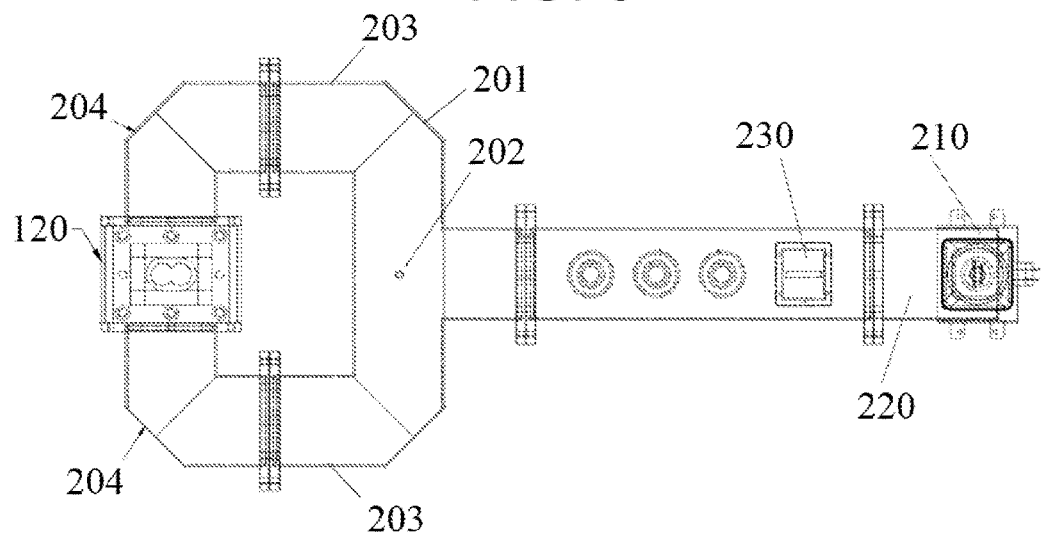
FIG. 6 is a sectional view of the microwave generator and the organic reaction module according to the invention.
Figure 7:
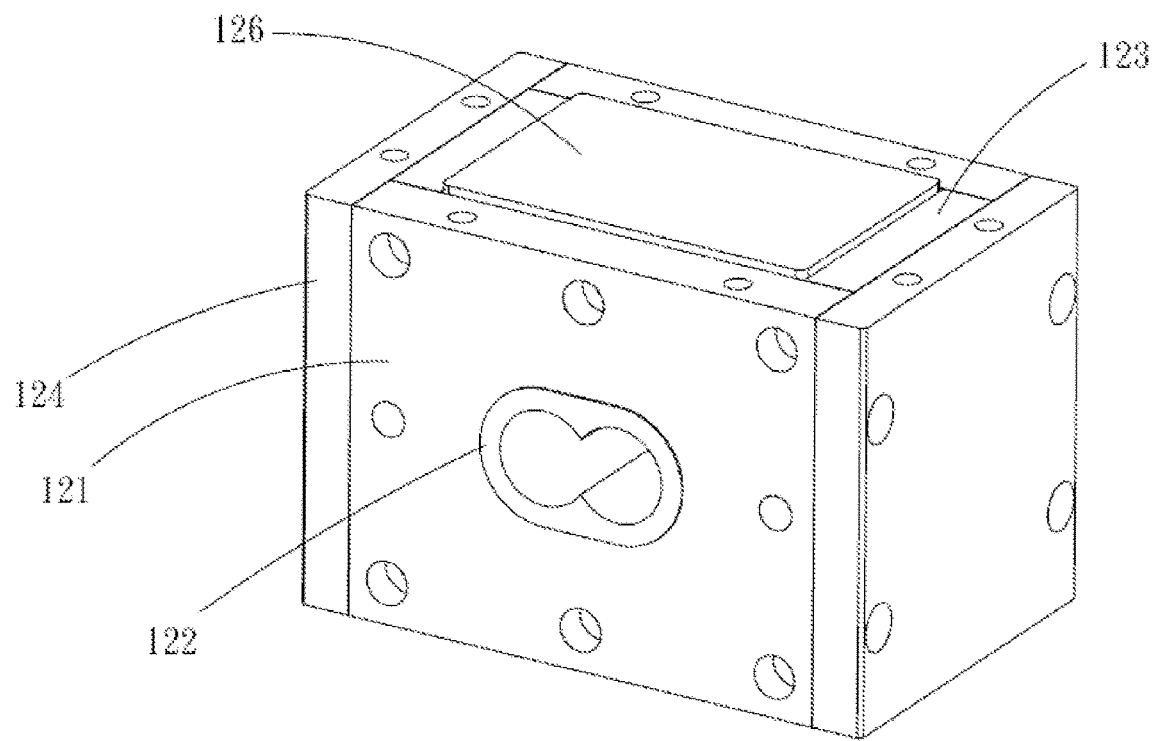
FIG. 7 is a structural diagram of the organic reaction module according to the invention.
Figure 8:
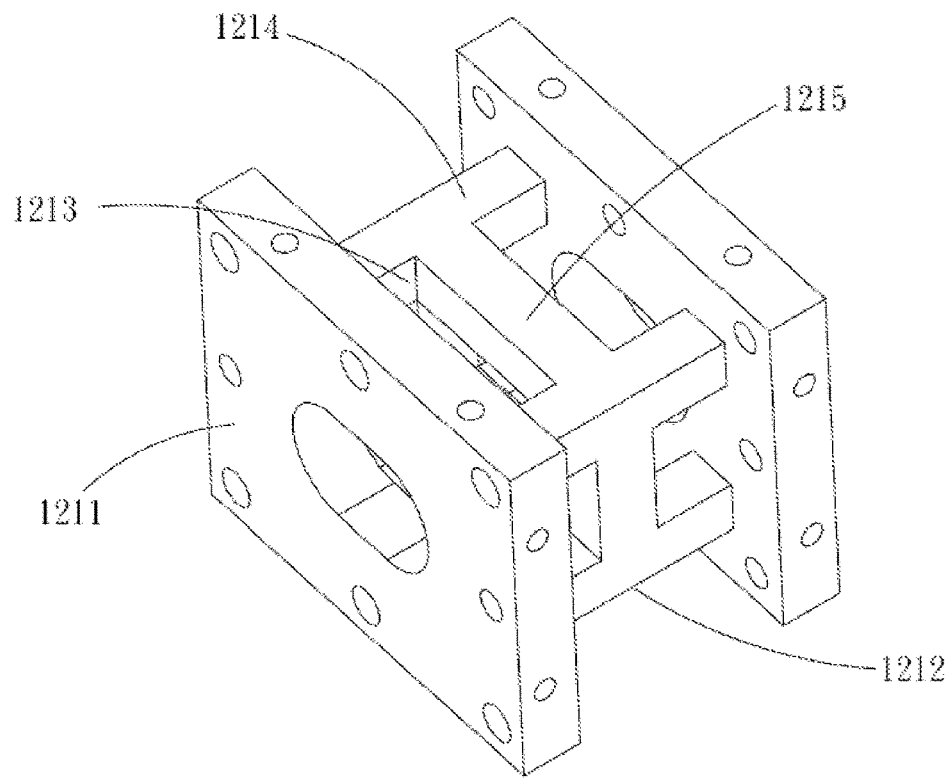
FIG. 8 is a structural diagram of a second conveying block according to the invention.
Figure 9:
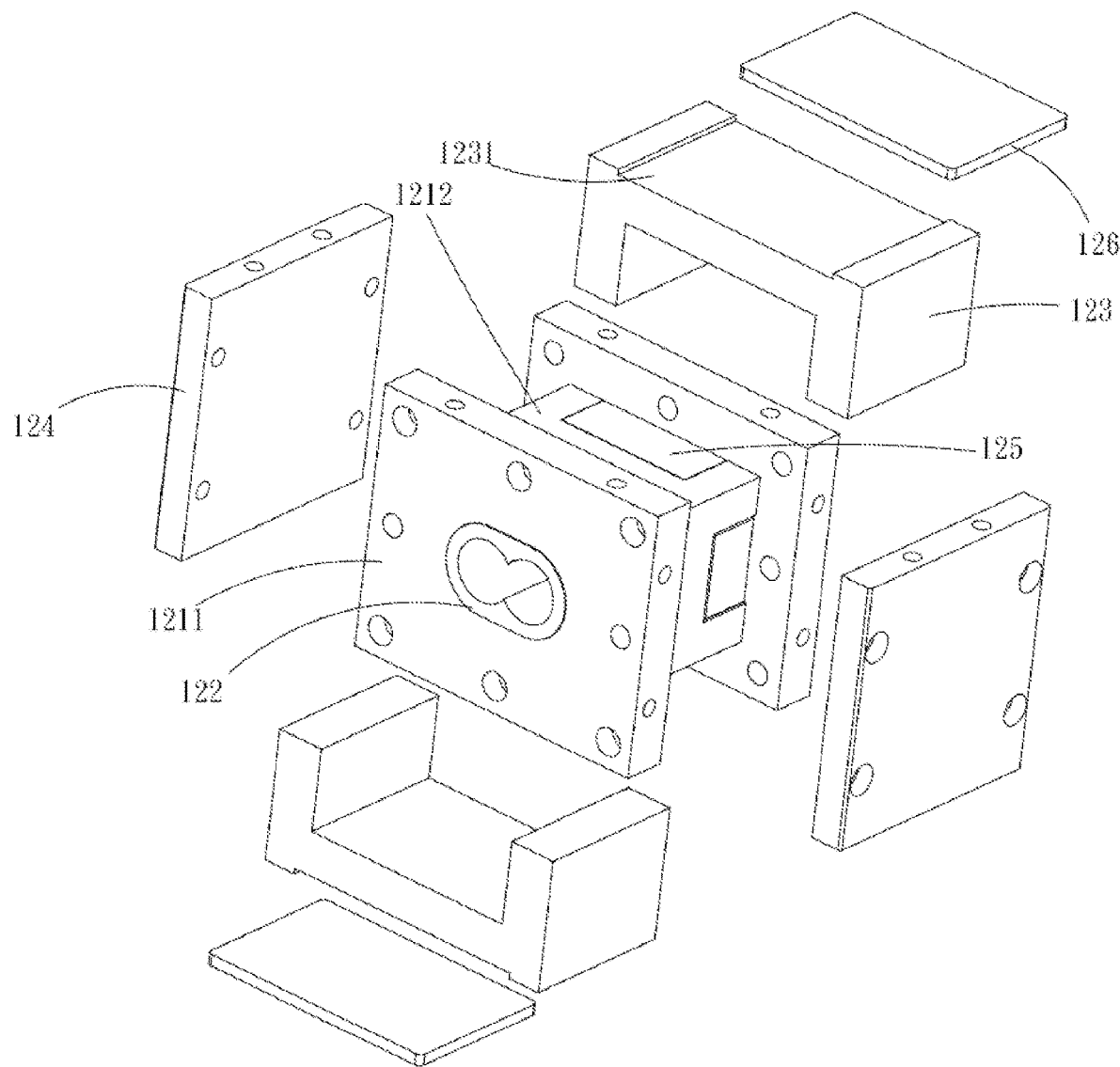
FIG. 9 is an exploded view of the organic reaction module according to the invention.

As shown in FIG. 1 to FIG. 9, the invention provides a microwave-enhanced extruder facility which comprises a screw extruder 100 and a microwave generator 200, wherein the screw extruder 100 is a co-rotating twin-screw extruding mechanism and comprises a feeding module 110 and an organic reaction module 120, the feeding module 110 is connected to the organic reaction module 120 and is to be connection to a feeding device 300, the feeding module 110 comprises a plurality of first conveying blocks 111 that are connected to each other, first barrels 112 are clamped in the first conveying blocks 111 and are made of zirconia, the first barrels 112 are connected to each other, and screws (not shown) are arranged in the first barrels 112; the feeding device 300 is connected to one of the first conveying blocks 111 and feeds materials into one of the first conveying blocks 111, and then the materials are driven by the screw in the first conveying block 11 to move forwards gradually and be mixed.

The cross-section of the first conveying blocks 111 is H-shaped, and L-shaped first insulating plates 113 are disposed on the periphery of each first conveying block 111 and are connected to surround the first barrel 112 to maintain the temperature of the materials in the first barrel 112.

The organic reaction module 120 is connected to the microwave generator 200 and comprises a second conveying block 121, wherein the microwave generator 200 is connected to the second conveying block 121, the second conveying block 121 is provided with two parallel clamping plates 1211 and a frame 1212 connecting the two clamping plates 1211, a second barrel 122 is clamped in the second conveying block 121 and is made of zirconia, and the screws are able to extend into the second barrel 122, so that microwaves generated by the microwave generator 200 can act on working segments of the screw, namely the portions, in the organic reaction module, of the screws; the second barrel 122 is clamped in the frame 1212, second insulating plates 123 are arranged on the periphery of the frame 1212 to maintain the material processing temperature in the second barrel 122, two sides of the clamping plates 1211 are connected to side partition plates 124 respectively, and the second insulating plates 123 are clamped in spaces defined by the side partition plates 124 and the frame 1212. Specifically, the second insulating plates 123 are U-shaped and are arranged at an upper end and a lower end of the frame 1212 respectively, so that the frame 1212 is wrapped in the second insulating plates 123, and the insulating effect on the second barrel 122 is guaranteed.

The frame 1212 is formed with a plurality of openings 1213, quartz blocks 125 are arranged in the openings 1213, and the microwaves generated by the microwave generator 200 enter the second barrel 122 via the quartz blocks 125 to heat materials in the second barrel 122 to promote an organic chemical reaction of the materials. The microwaves generated by the microwave generator 200 directly enter the second conveying blocks 121, so the risk of a microwave leakage is effectively lowered, and it is ensured that the microwave leakage is less than a safety value.

Specifically, the frame 1212 comprises four first connecting pillars 1214 and a second connecting pillar 1215, wherein the cross-section of the first connecting pillars 1214 and the cross-section of the second connecting pillar 1215 are both square, the first connecting pillars 1214 are arranged at four corners of the clamping plates 1211 respectively and are connected through the second connecting pillar 1215, and the openings 1213 are defined by the first connecting pillars 1214 and the second connecting pillar 1215.

In one embodiment, quartz blind plates 126 are arranged at an upper end and a lower end of the second conveying block 121 respectively and are used to guarantee the sealing performance of the periphery of the second conveying block 121, the quartz blind plates 126 are correspondingly arranged at outlets of the microwave generator 200, and the microwaves generated by the microwave generator 200 penetrate through the quartz blind plates 126 and the quartz blocks 125 to heat the materials in the second barrel 122. Specifically, accommodating grooves 1231 are formed in outer sides of the second insulating plates 123, and the quartz blind plates 126 are arranged in the accommodating grooves 1231.

The microwave generator 200 comprises a magnetron 210, an exciter 220, a directional coupling port 230, and the like, and this is a common structure of the microwave generator 200 in the prior art and will no longer be detailed. One end of the microwave generator 200 is connected to a power division tube 201, a power divider 202 is arranged in the power division tube 201, two ends of the power division tube 201 are connected to two connecting tubes 203 respectively, one end of each connecting tube 203 is connected to a waveguide tube 204, the waveguide tubes 204 are connected to the upper end and the lower end of the second conveying block 121 respectively, and the microwave generator 200 transmits microwaves into the second barrel 122 through the waveguide tubes 204 from the upper end and the lower end of the second conveying block 121 respectively to heat the materials in the second barrel 122, so that the heating efficiency of the materials in the second barrel 122 is effectively improved, and the chemical reaction rate of the materials in the second barrel 122 is increased.

In one embodiment, the organic reaction module 120 comprises two second conveying blocks 121 which are connected to the waveguide tubes 121 respectively, the microwave generator 200 transmits microwaves into the second barrels 122 of the two second conveying blocks 121 through the waveguide tubes 204 respectively, and the two second conveying blocks 121 are connected through the first conveying blocks 111, so that the structural integrity of the screw extruder 100 is guaranteed.

When the microwave-enhanced extruder facility is assembled, the feeding module 110 and the organic reaction module 120 of the screw extruder are connected at first to connect the first conveying blocks 111 and the second conveying blocks 121, and then the first barrels 112 and the second barrels 122 are connected, so that the integrity of the screw extruder is guaranteed; then, the screws are disposed in the first barrels 112 and the second barrels 122, the external feeding device 300 conveys materials into the feeding module 110 from the first conveying blocks 111, then the materials are gradually conveyed into the second conveying blocks 121 by the screws, and microwaves generated by the microwave generator 200 heat the materials in the second barrels 122 from upper and lower ends of the second conveying blocks 121 respectively, so that the organic chemical reaction rate of the materials in the screw extruder is effectively increased.

The invention further provides an organic reaction module which comprises the second conveying block 121, the second barrel 122, the second insulating plates 123, the side partition plates 124 and the quartz blind plates 126 of the microwave-enhanced extruder facility.

Other technical features of the organic reaction module are identical with the technical features of the microwave-enhanced extruder facility, and will no longer be detailed here.

To sum up, according to the microwave-enhanced extruder facility and the organic reaction module of the invention, the waveguide tubes 204 are connected to the upper end and the lower end of the second conveying block 121 respectively, and microwaves generated by the microwave generator 200 heat the materials in the second barrel 122 from the upper end and the lower end of the second conveying block 121 respectively, so that the organic chemical reaction rate of the materials in the screw extruder is effectively increased.

The above embodiments are merely several possible ones of the invention and are specifically described in detail, but these embodiments should not be construed as limiting the scope of the invention. It should be pointed out that those ordinarily skilled in the art can make different transformations and improvements without departing from the conception of the invention, and all these transformations and improvements should also fall within the protection scope of the invention. Thus, the protection scope of the invention should be subject to the appended claims.

What is claimed is:

1. A microwave-enhanced extruder facility, comprising a screw extruder and a microwave generator, wherein the screw extruder comprises a feeding module and an organic reaction module, the feeding module is connected to the organic reaction module and comprises a plurality of first conveying blocks connected to each other, first barrels are clamped in the first conveying blocks and are connected to each other, and screws are arranged in the first barrels; the organic reaction module is connected to the microwave generator and comprises a second conveying block, the microwave generator is connected to the second conveying block, the second conveying block is provided with two parallel clamping plates and a frame connecting the two clamping plates, a second barrel is clamped in the second conveying block, the screws are able to extend into the second barrel, the second barrel is clamped in the frame, second insulating plates are arranged on a periphery of the frame, two sides of the clamping plates are connected to side partition plates respectively, the second insulating plates are clamped in spaces defined by the side partition plates and the frame, and quartz blind plates are arranged at an upper end and a lower end of the second conveying block respectively and are correspondingly disposed at outlets of the microwave generator, wherein the frame is formed with a plurality of openings, quartz blocks are arranged in the openings, and microwaves generated by the microwave generator enter the second barrel via the quartz blocks, and the frame comprises four first connecting pillars and a second connecting pillar, a cross-section of each of the first connecting pillars and a cross-section of the second connecting pillar are both square, the first connecting pillars are arranged at four corners of the clamping plates respectively and are connected through the second connecting pillar, and the openings are defined by the first connecting pillars and the second connecting pillar.

2. The microwave-enhanced extruder facility according to claim 1, wherein the feeding module is to be connected to a feeding device, and the feeding device is connected to one of the first conveying blocks and feeds materials into one of the first conveying blocks.

3. The microwave-enhanced extruder facility according to claim 1, wherein a cross-section of each of the first conveying blocks is H-shaped, and first insulating plates are arranged on a periphery of each of the first conveying blocks.

4. The microwave-enhanced extruder facility according to claim 1, wherein the first barrels and the second barrel are made of zirconia.

5. The microwave-enhanced extruder facility according to claim 1, wherein an end of the microwave generator is connected to a power division tube, a power divider is arranged in the power division tube, two ends of the power division tube are connected to connecting tubes respectively, an end of each of the connecting tubes is connected to a waveguide tube, and the waveguide tubes are connected to the upper end and the lower end of the second conveying block respectively.

6. The microwave-enhanced extruder facility according to claim 5, wherein the organic reaction module comprises two second conveying blocks which are connected to the waveguide tubes respectively, the microwave generator transmits microwaves into the second barrels of the two second conveying blocks through the waveguide tubes respectively, and the two second conveying blocks are connected through the first conveying blocks.

7. The microwave-enhanced extruder facility according to claim 5, wherein the feeding module is to be connected to a feeding device, and the feeding device is connected to one of the first conveying blocks and feeds materials into one of the first conveying blocks.

8. The microwave-enhanced extruder facility according to claim 5, wherein a cross-section of the first conveying blocks is H-shaped, and first insulating plates are arranged on a periphery of each of the first conveying blocks.

9. The microwave-enhanced extruder facility according to claim 5, wherein the first barrels and the second barrel are made of zirconia.

10. An organic reaction module, comprising a conveying block which is provided with two parallel clamping plates and a frame connecting the two clamping plates, wherein a barrel is clamped in the conveying block and is clamped in the frame, insulating plates are arranged on a periphery of the frame, two sides of the clamping plates are connected to side partition plates respectively, the insulating plates are clamped in spaces defined by the side partition plates and the frame, and quartz blind plates are arranged at an upper end and a lower end of the conveying block respectively, wherein the frame is formed with a plurality of openings, quartz blocks are arranged in the openings, and the frame comprises four first connecting pillars and a second connecting pillar, a cross-section of each of the first connecting pillars and a cross-section of the second connecting pillar are both square, the first connecting pillars are arranged at four corners of the clamping plates respectively and are connected through the second connecting pillar, and the openings are defined by the first connecting pillars and the second connecting pillar.

* * * * *